United States Patent [19]

Betzner et al.

[11] Patent Number: 4,533,436

[45] Date of Patent: Aug. 6, 1985

[54] APPARATUS FOR BLOW LINE ADDITION OF THERMOSETTABLE BINDER IN FIBERBOARD MANUFACTURE INCLUDING A COOLING NOZZLE

[75] Inventors: William E. Betzner, St. Petersburg; Richard K. Holtman, Largo, both of Fla.

[73] Assignee: The Celotex Corporation, Tampa, Fla.

[21] Appl. No.: 523,229

[22] Filed: Aug. 15, 1983

Related U.S. Application Data

[62] Division of Ser. No. 371,895, Apr. 26, 1983, Pat. No. 4,402,896.

[51] Int. Cl.³ .............................. D04H 3/16; D21C 1/14
[52] U.S. Cl. ....................................... 162/261; 162/10;
162/23; 118/303; 241/15; 241/60
[58] Field of Search ............... 162/165, 20, 261, 24,
162/25, 26, 28, 52, 246, 13, 9, 234, 10; 241/15,
28, 60; 264/109, 115, 128; 156/62.4; 118/303

[56] References Cited

U.S. PATENT DOCUMENTS

| | | | |
|---|---|---|---|
| 2,199,087 | 4/1940 | Drill et al. ................................ | 49/1 |
| 2,872,337 | 2/1959 | Heritage et al. ...................... | 162/165 |
| 3,310,238 | 3/1967 | Bryant et al. ...................... | 239/132.3 |
| 3,494,992 | 2/1970 | Wiegand ............................ | 264/121 |
| 3,636,199 | 1/1972 | Jenks et al. .......................... | 264/134 |
| 3,916,825 | 11/1975 | Schnitzler et al. ................... | 118/303 |
| 3,919,017 | 11/1975 | Shoemaker et al. ................ | 156/62.2 |
| 3,930,110 | 12/1975 | Shoemaker et al. ................ | 428/424 |
| 4,209,433 | 6/1980 | Hse ...................................... | 260/29.3 |
| 4,279,788 | 7/1981 | Lambuth ............................... | 260/9 |
| 4,293,456 | 10/1981 | Reischl ................................. | 260/9 |

OTHER PUBLICATIONS

The Donald S. Gilmore Laboratories, The Upjohn Company, "Highlights: Isobind 100; A Self-Releasing Isocyanate Binder for Reconstituted Wood Products", Report No. 19, 10/80.
Upjohn Polymer Chemicals Division, "Isocyanate Binder Technology, Isobind 100".

*Primary Examiner*—Steve Alvo
*Attorney, Agent, or Firm*—James W. Grace; Charles W. Vanecek

[57] ABSTRACT

A method and apparatus for producing a synthetic board from cellulosic and/or lignocellulosic materials wherein a thermosettable binder, preferably a polyisocyanate binder, is applied through a cooled nozzle to the hot and wet fibrous material in the blow line out of the refiner of a board forming process. Polyphenylpolyisocyanates, such as a mixture of diphenylmethane-4,4'-diisocyanate and polymethylene polyphenyl polyisocyanates, are a particularly suitable binder.

6 Claims, 4 Drawing Figures

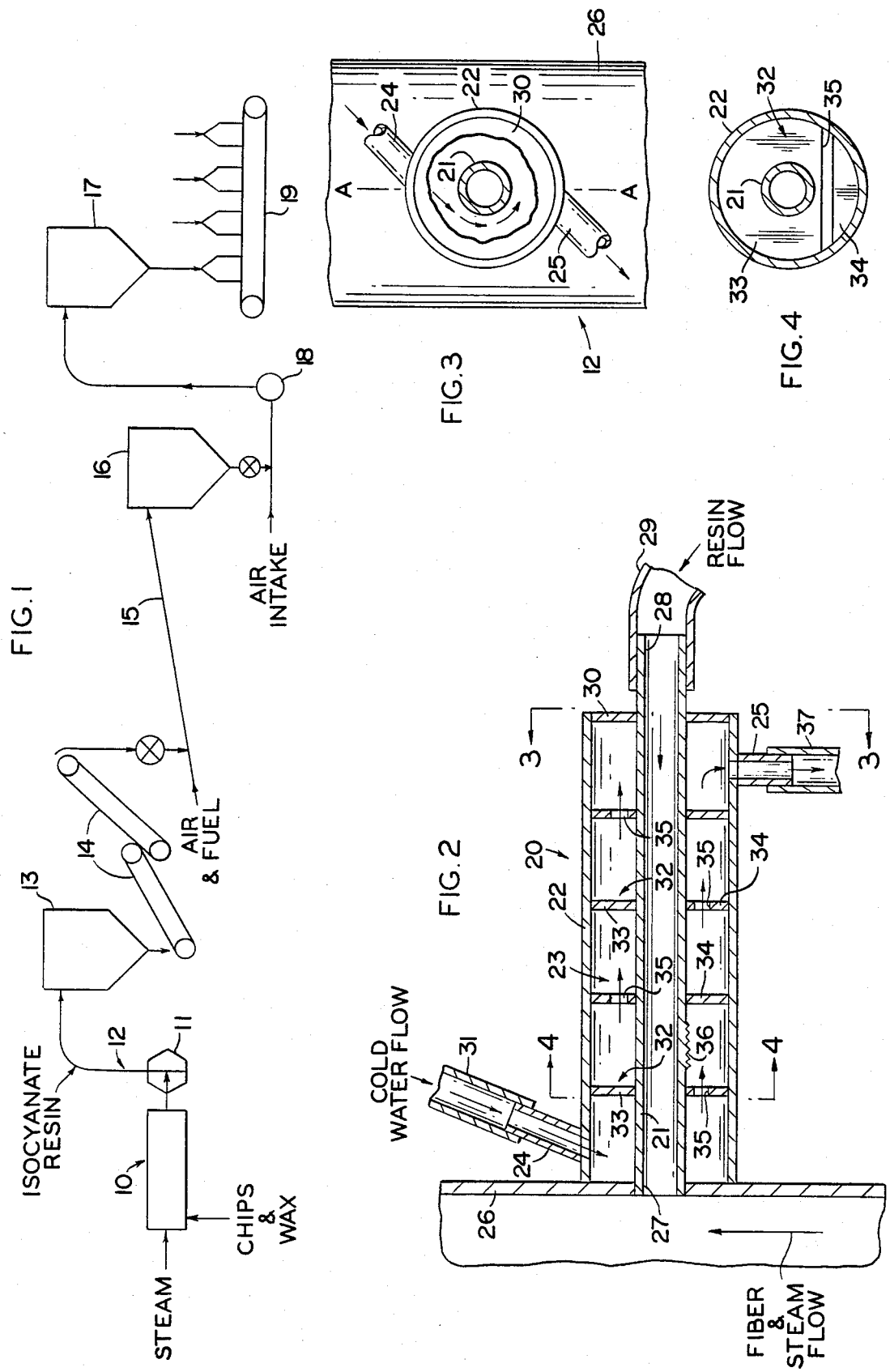

APPARATUS FOR BLOW LINE ADDITION OF THERMOSETTABLE BINDER IN FIBERBOARD MANUFACTURE INCLUDING A COOLING NOZZLE

This is a division of application Ser. No. 371,895, filed Apr. 26, 1983, now U.S. Pat. No. 4,402,896.

BACKGROUND OF THE INVENTION

1. Field of the Invention

This invention relates to a method and apparatus for producing a synthetic board from cellulosic and/or lignocellulosic materials utilizing a polyisocyanate binder system. The binder is applied to the hot and wet fibrous material in the blow line out of the refiner of the board forming process.

2. Description of the Prior Art

Many board products are manufactured by the basic process of consolidating or joining together bodies of cellulosic and/or ligno-cellulosic materials or furnish using pressure, heat and a chemical binder. Typical binders used in making such products are thermosetting resins such as phenol-formaldehyde, resorcinol-formaldehyde, melamine-formaldehyde, urea-formaldehyde, urea-furfural and condensed furfuryl alcohol resins. Another binder system, which has been gaining favor in recent years, involves the use of organic polyisocyanates, either alone or in combination with other binder materials, such as urea-or melamine-formaldehyde resins, phenol-formaldehyde resins, etc.

An advantage of polyisocyanate binders is that they can be used with high moisture-content furnish, thus reducing the costs of drying, and eliminating the "blue haze" sometimes found when drying to low moisture content. Also, the bonds developed with these binders are very resistant to water and thus have good exterior exposure characteristics.

Since polyisocyanate binders are highly reactive, their blending with the furnish is conventionally accomplished at low temperature and humidity conditions to avoid premature curing of the binder. Special blending equipment must be provided and maintained in good working order for this purpose. If the blending system is not properly constructed and operated, the result could be the production of inconsistent or low-quality board. It would be highly desirable if an improved method of producing a synthetic board from ligno-cellulosic and/or cellulosic materials and polyisocyanate binders could be found which yields a high quality board product without requiring any complicated or expensive blending equipment.

OBJECTS OF THE INVENTION

It is therefore an object of the present invention to provide an improved method of producing a synthetic board from ligno-cellulosic and/or cellulosic materials by employing as binder a polyisocyanate resin which is applied directly to the hot and wet fiber material in the blow line out of the refiner of a fiberboard manufacturing plant.

It is another object of the present invention to provide an improved fiberboard production method which utilizes a pressurized refining system and an isocyanate binder, wherein the isocyanate is applied to the fibers to the blowline out of the refiner and no special resin blending equipment is used subsequently in the board making process.

It is still another object of the present invention to provide an improved method and apparatus which utilize the blow line addition of an isocyanate binder in the production of medium and high density fiberboard.

It is yet another object of the present invention to provide a water cooled device for the introduction of undiluted or diluted isocyanate or other thermosettable resin binder into the hot blow line out of the refiner of a hardboard manufacturing plant.

It is a further object of the present invention to provide a board product from cellulosic material, especially a medium or high density fiberboard product, which has a combination of excellent properties, including superior strength and moisture resistance, through a board manufacturing process wherein an isocyanate binder is applied directly to the hot moist fibers in the blow line out of the refiner of a pressurized refining system.

These and other objects and advantages of the present invention will become more apparent to those skilled in the art when the instant disclosure is read in conjunction with the accompanying drawings.

SUMMARY OF THE INVENTION

The above objects have been achieved in the fiberboard manufacturing process of the present invention, wherein the raw material to be formed into the finished board product is refined at an intermediate point during the process into hot and wet fibrous material. It has unexpectedly been found that a highly reactive isocyanate resin binder can be applied to the intermediately formed, moist fibers while they are still extremely hot without causing curing out of the isocynate resin during subsequent processing. The finished products have excellent physical characteristics.

In a preferred embodiment of the process of the present invention, the cellulosic and/or ligno-cellulosic raw material are subjected to a high temperature steam treatment. A wax is preferably included with the raw material to be steam treated. This steam treated material is then reduced in size substantially to fibers by any known means such as by defibrators having closely opposed, oppositely rotating discs or a combination of a rotating and a stationary disc. The steam treatment and fiberization are suitably accomplished in a pressurized refiner where the raw material is first fed into a steam digester, and, after this initial steaming is completed, is then passed to a refiner to fiberize the material under further steam pressure. The hot and moist fibers formed in the refiner are blown by the steam passing therethrough into a line (so-called "blow line") leading from the refiner. The isocyanate binder is injected through an entry port to the blow line onto the hot and moist fibers passing along inside the line. Air turbulence within the blow line brings about binder dispersion onto the fibers.

The resin treated fibers are blown into a dryer, such as a direct fired, tube type dryer, which reduces moisture to about 5 to 16%. The dried fibers are then formed into mats by a known vacuum/screen forming process. Finally, the mats are converted into the finished board products in a conventional manner.

The polyisocyanate of the binder system may suitably be any organic polyisocyanate compound containing at least 2 active isocyanate groups per molecule, or mixtures of such compounds. Polyphenylpolyisocyanates, such as diphenylmethane-4,4'-diisocyanate and polymethylene polyphenyl polyisocyanates, are particularly suitable. A highly effective blow line application of the polyisocyanate is achieved by emulsifying the polyisocyanate prior to its application.

In carrying out the process of the present invention, a cooled nozzle means is located on the blow line for applying the isocyanate binder to the hot and moist fibers being propelled within the blow line. The cooled nozzle facilitates the introduction of diluted or undiluted isocyanate (or other thermosettable resin) into the hot blow line by preventing or reducing advanced resin cure which would plug the nozzle if unchecked. The cooled nozzle advantageously comprises a resin infeed pipe which is attached to the blow line wall and communicates with the interior of the blow line, and is surrounded by a heat exchange jacket through which cooling fluid is circulated. The jacket preferably contains baffle means to increase turbulence and hence increase heat transfer.

DESCRIPTION OF THE DRAWINGS

The invention will now be described with reference to the accompanying drawings in which:

FIG. 1 is a diagrammatic representation of a flow sheet of the preferred embodiment of the method of the present invention for introducing a polyisocyanate binder in a synthetic board-making process;

FIG. 2 is a side cross-sectional view of a water cooled device for injecting neat isocyanate binder into the blow line of a pressurized digester-refiner system;

FIG. 3 is a view, partially broken away, of the water cooled device taken along line 3—3 of FIG. 2, showing pipes 24 and 25 angled to aid water circulation; and FIG. 4 is a cross-sectional view taken on the plane of line 4—4 in FIG. 2 and viewed in the direction indicated, showing one of the baffles of the water cooled device.

DETAILED DESCRIPTION OF THE INVENTION

The method of the present invention is suitable for processing cellulosic starting materials in general, and is particularly useful for forming wood chips into hardboard products. Mixtures of cellulosic particles may be used. The production of a synthetic board in accordance with the present invention typically starts with the screening of wood chips to remove therefrom both oversized and undersized material, as, e.g., fines and dirt. The chips also can be subjected to a preliminary washing step.

After these preliminary operations, the cleaned chips are conveyed to storage bins that feed pressurized digester-refiner systems, which can be of a conventional design. The pressurized refiners refine the raw woody material into fiber under steam pressure. The wood chips pass from the steam-pressurized digester into the refining section while still under pressure, and this pressure is maintained during the refining.

Referring to FIG. 1, a digester 10 is provided for presteaming of the raw chips. In practice, a number of digesters are used in combination with a like number of refiners in the board making process. Either horizontal or vertical steam digesters of the continuous or batch types can be used. Advantageously, molten wax is metered onto the chips as they are fed to digester 10 in order to impart a degree of water repellancy to the board product. The wax suitably comprises about 0.5 to 5% by weight, dry solids basis, of the formulation employed in making the board. Generally, steaming in the digester is carried out for about five to ten minutes at a pressure of approximately 80 to 120 psi. In a typical operation, the chips are cooked in a horizontally or vertically oriented, continuous steam digester for a period of about 5 minutes at 100 psi steam pressure.

As the cooked chips emerge from the digester, they are blown through a refiner 11, which is also operated under steam pressure. Although both single- and double-revolving disc refiners may be used, a double-revolving-disc refiner has been found to be especially effective in accomplishing the refining. The two counter revolving discs of this refiner are only a very small distance apart, as, e.g., about 0.05 inch. The discs are patterned with ridges and channels, and, as the chips pass between these discs, they are shredded apart into individual fibers or fiber bundles, which are then blown through an orifice out of the refiner. The steam pressure in the refiner is usually 80 to 150 psig, corresponding to a temperature range of 320° to 365° F. The fibers which emerge from the refiner into the blow line are at a moisture content of 50% or higher by weight, as, e.g., 50–60%, based on the total solids weight, and a temperature of at least about 212°–260° F., generally above about 245° F. After refining, the stock and steam are conveyed through blow line 12 to refiner cyclone 13, where the steam and fiber are separated.

It is known that the addition of phenolic resin binders through the blow line running from a pressurized refiner usually results in good resin distribution. However, the processing conditions encountered in this system are so severe that this method of addition has been avoided heretofore in the case of isocyanate resins because of the very rapid cure tendencies of isocyanates at relatively low temperatures and with water.

It has now, surprisingly, been found that isocyanate resin binders can be added to the wet or semi-wet hot fiber in the blow line out of a fiber refiner without any curing out of the isocyanate resin in the process. The isocyanate binder can be applied successfully to the fiber through the refiner blow line without resin buildup problems so as to produce fiberboard having excellent physical properties. The isocyanate binder is advantageously emulsified prior to its application into the refiner blow line. Because the isocyanate can be simply added to the blow line of an existing fiberboard manufacturing plant, there is no need for special blending equipment and the maintenance of such equipment.

The isocyanate resin is added to the blow line through cooled nozzle 20 and mixes with the hot fiber emerging from the refiner. The isocyanate treated fiber is then blown through cyclone 13 and is carried by belt conveyors 14 to a direct fired, dryer tube 15 (approximately 215 ft. in length), which reduces moisture to about 5 to 16, preferably 10 to 16%. The treated fiber is on the belt conveyors for approximately 30 seconds, during which time it is at a temperature of at least about 200° F. The dryer inlet and outlet temperatures are about 350° and 165° F., respectively. The fiber remains in the dryer for about 2 or 3 seconds, and thereafter is conveyed through pollution control cyclones 16 and 17, with blower fan 18 providing an air stream to convey the fibers from cyclone 16 to and through cyclone 17. The fibers entrained in the air stream are discharged from cyclone 17 and deposited on felters 19 to be formed into mats. The moisture content of the mat formed is generally 8 to 16% by weight, on a dry weight basis.

Both the mat and subsequent board formations are accomplished in a conventional manner. Thus, the isocyanate treated fiber is conveniently felted onto a continuously moving screen which passes over a number of vacuum boxes. Over each of the boxes a felting head deposits a uniform layer of fiber onto the screen and these layers accumulate to the desired weight. This continuous mat is then passed through a pre-compressor which consists of a massive belt driven roll press that compresses the loose fiber mat and makes it more handleable in subsequent processing. After the pre-compressor, the mat is cut with a flying saw into the desired lengths and these are fed into a conventional board-forming press, such as a typical medium density fiberboard press having multiple steam heated platens and optionally equipped with an RF heating unit with from 600 to 1600 KW capacity. The press consolidates and compresses the mat to the desired thickness while heat and optionally an RF heating unit cures the resin. During the pressing operation the mats are generally heated to a temperature of about 250°–400° F. as they are being compressed at about 100–600 psi. Pressing times are typically about 2–10 minutes. The exact conditions to be utilized in the pressing and heat curing of the board product can, of course, be easily selected by one skilled in the art depending upon the desired characteristics of the finished product. It is beneficial to apply a release agent, such as, for example, silicone, glycerin or wax emulsion, on the press plates to minimize sticking. After pressing, the boards are trimmed to rough size and palletized, and may be allowed to age for several days. This aging allows the boards to equilibrate and takes advantage of any postcuring that might occur in the stacks of stored boards. The boards may then be sanded to close thickness tolerances with sanders that use several grades of paper (usually 60-80-100) and sand both top and bottom of the boards in a single pass.

The binder system to be introduced into the blow line in accordance with the invention may suitably contain any organic polyisocyanate containing two or more isocyanate groups. The polyisocyanates which may be employed include the aliphatic, cycloaliphatic and aromatic polyisocyanates, and combinations thereof. Representative of these types are the following: m- and p-phenylene diisocyanates, toluene-2,4- and 2,6-diisocyanates, diphenylmethane-4,4-diisocyanate, 4-chloro-1,3-phenylene diisocyanate, napthalene-1,5-diisocyanate, diphenylene-4,4-diisocyanate, 3,3'-dimethyl diphenylmethane-4,4'-diisocyanate, 3-methyl-diphenylmethane-4,4'-diisocyanate, diphenylether diisocyanate, cyclohexane-2,4- and 2,3-diisocyanates, 1-methyl cyclohexyl2,4-and 2,6-diisocyanates, bis-(isocyanatocyclohexyl-) methane, 2,4,6-triisocyanatotoluene, 2,4,4-triisocyanatodiphenyl ether, polymethylene polyphenyl polyisocyanates, methylene diphenyl diisocyanate, triphenylmethane triisocyanate, 3,3'-ditolylene-4,4-diisocyanate, 4,4'-methylenebis(2-methyl-phenyl isocyanate), hexamethylene diisocyanate, and cyclohexylene-1,3-and 1,2-diisocyanates.

Preferred polyisocyanates among the foregoing are toluene-2,4- and 2,6-diisocyanates, diphenylmethane-4,4-diisocyanate, polymethylene polyphenylisocyanates, triphenylmethane triisocyanate, and mixtures thereof. Especially useful are water-emulsifiable and self-releasing isocyanate binders, such as those available from the Upjohn Company, Polymer Chemicals Division under the trademark "Isobind 100," and from Rubicon Chemicals Inc. under the trade designation Rubinate 4397-44.

The isocyanate binder system should have a viscosity which makes it safe and easy to handle in the process of the invention. Therefore, it is desirable to use polyisocyanates whose molecular weight is from about 200 to 10,000, preferably from 300 to 2,000. Polyisocyanates of too low molecular weight are quite volatile and toxic and accordingly more dangerous to use in a hot press. Polyisocyanates of too high molecular weight tend to be too viscous to be handled and used readily as binders. Even when polyisocyanates of too high molecular weight are emulsified to reduce their viscosity, they tend to be unstable and have a too limited service life.

Polyisocyanates of suitably high molecular weight may be prepared in known manner by taking advantage of the reactive isocyanate groups and building up the isocyanate to higher molecular weight. Chain builders useful for this purpose are those containing active hydrogen atoms, in particular the polyesters and polyols, such as the glycols and glycol ethers used in predetermined amount sufficient to produce reactive polyisocyanate prepolymers of the desired molecular weight and isocyanate functionality.

Illustrative glycols and glycol ethers are the following: polyethylene glycols to 6000 mol. wt. (200 to 2000 preferred), polypropylene glycols to 6000 mol. wt. (200 to 2000 preferred), ethylene glycol monobutyl ether (butyl cellosolve), diethylene glycol monobutyl ether (butyl carbitol), ethylene glycol monoethyl ether (cellosolve), diethylene glycol monoethyl ether (carbitol), cellosolve acetate, dimethoxy tetraglycol, dipropylene glycol methyl ether, ethylene glycol monomethyl ether (methyl cellosolve), sorbitol, phenyl cellosolve, propylene glycol methyl ether, triethylene glycol, tripropylene glycol methyl ether, glycols or polyglycols partially esterified with polycarboxylic organic acids such as adipic, sebacic, succinic, oxalic, etc., 2,4,6-hexane triol, glycerol, propylene glycol partially esterified with adipic acid, trimethylol propane, and acrylic and methacrylic acid esters.

Where the polyisocyanate binder is capable of forming a stable emulsion in water, the binder may be emulsified and applied as an emulsion of suitably low viscosity, e.g., a viscosity of about 10 to 50 centipoises measured at 25° C. In instances where the isocyanate binder is not emulsified prior to application, it may be applied typically at a viscosity of about 50 to 1000 centipoises at 25° C.

The quantity of binder needed in a particular application can be determined by simple experimentation. An application of from about 1 to 10%, preferably 3 to 6%, of isocyanate binder, solids basis, is generally employed.

The present invention provides a simple and economical method of applying an isocyanate binder in the production of board products, especially medium and high density fiberboard products. Because the isocyanate simply is applied to and blends with the hot and moist fibers as these fibers are being propelled through the blow line out of the refiner, there is no need for special blending equipment and procedures to accomplish the binder incorporation. Also, precise control of moisture content before hot pressing can be achieved in a single drying step, without the necessity for additional moisture control in a blending step. Another advantageous feature of the present invention is that, by providing a particularly efficient technique for utilizing an isocyanate binder in the manufacture of hardboard, it makes it possible to avoid the use of phenolic binders and the attendant disadvantages associated with the phenolics. For example, boards made with phenolic binders generally require higher press temperatures and longer cure times than isocyanate bound boards, thus necessitating greater energy expenditures in producing the phenolic bound boards and rehumidification to restore to these boards the moisture lost in the severe pressing step. The present process is more energy efficient and eliminates the necessity for board rehumidification which otherwise would normally be required to achieve satisfactory out-of-press board moisture levels, as, e.g., 5 to 8% moisture.

FIG. 2 illustrates cooled nozzle 20, which can be used for injecting isocyanate binder into the blow line out of a pressurized digester-refiner apparatus. Cooled nozzle 20 enables undiluted isocyanate (or other resin binder) to be introduced into the hot blow line in the manufacture of hardboard. Cooled nozzle 20 comprises an elongated hollow central tube 21 having two open ends and an outer tube or housing 22 arranged coaxially of the central tube and defining therewith a cooling fluid duct 23 having one or more cooling fluid inlets 24 and one or more cooling fluid outlets 25 (only one inlet and outlet shown in FIG. 2). The preferred cooling fluid is water.

Central tube 21, which advantageously extends horizontally outward from blow line wall 26, can be formed of any suitable material, such as, for example, copper, brass or steel piping. One open end 27 of tube 21 is adapted to communicate with blow line 12, while the other end 28 is adapted to communicate with a resin feed line 29, whereby resin fed from said feed line into tube 21 in the direction of the arrow shown in FIG. 2 is caused to pass through said tube and into the interior of said blow line. Inner tube end 27 is suitably attached, such as by welding, to blow line wall 26. Resin feed line 29 is fitted around outer tube end 28.

Annular cooling fluid duct 23 is formed within tubular casing or housing 22, which is composed of any suitable metal and arranged coaxially around the central duct 21. Outer jacket casing 22 is suitably of much larger diameter than inner, resin feed pipe 21. The inner end of casing 22 located to the exterior of inner tube end 27 is attached, such as by welding, to blow line wall 26. Additionally, a circular plate-like member 30 having a centrally located, circular opening for tube 21 is welded or otherwise secured at both its outer and inner circular edges to tubes 22 and 21, respectively, thus providing a totally enclosed, jacketed area about the inner tube 21. Outer end 28 of tube 21 terminates a short distance to the exterior of this jacketed area to provide a place for attachment of feed line 29 to the tube.

A short, cooling fluid feed pipe 24 of any suitable metal is secured (e.g., by welds) over a top opening in casing 22 so that pipe 24 communicates with cooling fluid duct 23. A cooling fluid feed line 31 is fitted around the upper, free end of pipe 24. Advantageously, feed pipe 24 is angularly positioned on casing 22 at a place near to blow line wall 26 to enhance fluid circulation and to direct the flow (illustrated by arrows in FIG. 2) of cooling fluid from feed pipe 24 toward the hottest area contacted by the injected isocyanate resin, i.e., the region where isocyanate delivery tube 21 connects with blow line wall 26. There is a critical need for cooling in this region to prevent advanced resin cure which would plug feed pipe 21. As shown in FIG. 3, pipe 24 is suitably angled from the vertical plane A—A to promote swirling of the cooling fluid about tube 21 along the course indicated by the arrows, and thereby enhance cooling.

The interior of cooling duct 23 advantageously is provided with at least one baffle means 32 to increase fluid turbulence and hence increase heat transfer. As shown in FIGS. 2 and 4, baffle means 32 can comprise two vertically extending plates 33 and 34 located one above the other and spaced from each other. The plates may be manufactured from any suitable metal. The outer (from the central tube wall) circular edges of upper and lower baffle plates 33, 34 are both welded or otherwise secured to the inside of the outer tube's wall. Upper plate 33 completely encircles inner tube 21, with the plate's inner circular edge welded or otherwise secured to the outside of the inner tube's wall. The lower and upper straight edges of plates 33 and 34, respectively, are spaced apart, whereby the plates in combination form a barrier across cooling fluid duct 23 except for the opening 35 between the plates. The baffle plates (4 combinations of plates are shown in FIG. 2) suitably are arranged within cooling duct 23 so that the openings therethrough are alternately located below and above central tube 21, i.e., in the combination of plates to the right of plates 33, 34 in FIG. 2, it is the lower plate which completely encircles inner tube 21, and so forth for the remaining two plate combinations. Other baffle means can be employed in cooling duct 23, such as a helical member(s) like the one described in U.S. Pat. No. 3,310,238. Additionally, the resin feed pipe surface which contacts the cooling fluid can be threaded, knurled or similarly fashioned, as at 36 in FIG. 2, to increase the surface area and improve heat transfer.

The direction of the cooling fluid's flow through the baffle arrangement of device 20 is shown by arrows in FIG. 2. The fluid (preferably cold water), upon encountering the baffle members, has induced in it a motion which ensures effective circulation around feed pipe 21. After flowing through duct 23, the cooling fluid flows therefrom in the direction of the arrows into exit pipe 25, which is secured (e.g., by welds) to the lower, outer end of casing 22 and fitted with a fluid discharge hose 37. Outlet 25 comprises a short pipe of any suitable metal whose upper open end communicates with duct 23 through an opening provided in casing 22. Advantageously, exit pipe 25 is angularly positioned on casing 22 to enhance cooling fluid circulation. The fluid flowing into hose 37 can be conveyed to a drain or employed for any useful purpose, for example, as sealing water, etc.

By permitting the neat addition of isocyanate or other resin binder directly into a hot blow line, the cooled nozzle of the invention eliminates the need for any dilution-emulsification equipment and additives. The device greatly simplifies the resin handling process and thus reduces both the equipment and finished board product costs. Alternatively, the device simply can be employed to cool partially diluted and emulsified isocyanate binders during their introduction into the blow line to ensure against resin buildup at the blow line entrance.

The invention is further illustrated by the following example:

EXAMPLE

This example illustrates the application of isocyanate binder to hot and moist wood fibers in the blow line out of a pressurized refiner in the manufacture of ⅜″ hardboard siding.

The isocyanate binder used was Isobind 100, which is available from the Upjohn Company, Polymer Chemicals Division. An emulsion was prepared by diluting this binder in a high shear mixer to 15% solids using water which contained 1.5% Scripset 700, a surfactant available from Monsanto Company.

The process of applying the emulsified isocyanate to the wood fibers can be illustrated by reference to FIG. 1 of the drawings. Suitably screened wood chips (mixed hardwoods, predominantly oak) were fed to digester 10. 1.7% by weight of paraffinic wax, dry solids basis, was metered onto the chips as they were fed to the digester. Steaming in the digester was carried out for about 5 minutes at a pressure of approximatly 100 psi. After exiting from digester 10, the cooked chips were blown through refiner 11, where they were subjected to 100 psi steam pressure, and into blow line 12. The moist fibers which entered the blow line were at a temperature of about 250° F.

Application of the above-described isocyanate emulsion onto the wood fibers was accomplished by introducing the emulsion directly from the high shear mixer into refiner blow line 12. The isocyanate binder was applied at a level of 4% by weight, dry solids basis.

The treated wood fibers were blown through cyclone 13 for fiber and steam separation, and through dryer 15 for moisture removal. Then, after being blown through pollution control cyclones 16 and 17, the fibers were deposited on felters 19 for mat formation. The mat moisture level was approximately 14%. The formed mat was subjected to a pre-compression, and thereafter cut into desired lengths and fed to the board-forming press. The press was maintained at a temperature of about 350° F., and the press cycle time (cure time in press) started at 4½ minutes and then was reduced to 4, 3½, 3 and 2½ minutes. The mat was compressed at about 500 psi pressure. The press closing speed was about 45 seconds, and the press degassing rate was about 15 seconds. The caul plates, which were used to bound each side of the mat while it was being pressed, were coated with Frekote 44, a release agent supplied by Frekote, Inc., Boca Raton, Fla., to prevent the fiberboard from sticking to these plates.

The properties of the resulting board products are set forth in the following Table wherein the testing was according to ASTM D-1037-78A, and wherein:
MOR = modulus of rupture
IB = internal bond
MC = moisture content.

performance of hardboard made with a phenol-formaldehyde binder.

The above-described process can be facilitated by utilizing the cooled nozzle of the invention at the injection port into the blow line. Use of the nozzle helps to avoid or minimize advanced resin cure at the injection port during the continuous board forming process of the invention.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:

1. In an apparatus for refining cellulosic material including a pressurized refiner wherein said cellulosic material is subjected to the action of steam under pressure and refined to hot and wet fibers, and a blow line communicating with said refiner for discharge therefrom of said fibers, the improvement comprising an inner tube having resin inlet and outlet ends, said resin inlet end being connected to a resin feed line and said resin outlet end being connected to said blow line, and a housing disposed about said inner tube to define an enclosed jacketed area about said inner tube, said housing having at least one cooling fluid inlet means adjacent the one end of said housing located to the exterior of said resin outlet end of said inner tube, said at least one cooling fluid inlet means being connected to a cooling fluid feed line, and at least one cooling fluid outlet means adjacent the other end of said housing located to the exterior of said resin inlet end of said inner tube, said at least one cooling fluid outlet means being connected to a cooling fluid discharge line.

2. The apparatus of claim 1 wherein said resin outlet end of said inner tube and said one end of said housing located to the exterior of said resin outlet end are attached to the wall of said blow line, and said resin inlet end of said inner tube extends a short distance outwardly of said other end of said housing.

3. The apparatus of claim 2 wherein
   (a) said at least one cooling fluid inlet means comprises a feed pipe secured to said housing and communicating with said enclosed jacketed area, said feed pipe being angularly positioned on said hous-

TABLE

| | Press Parameters | | DRY PHYSICAL TESTS | | | | 24 HOUR WATER ABS. | | BOARD MOIST | LINEAR EXP. | 6 CYCLE | |
|---|---|---|---|---|---|---|---|---|---|---|---|---|
| Press Load | Binder % | Cycle Time min. | MOR PSI | DEN. PCF | IB PSI | DEN. PCF | % Thick. Inc. | % Wt. Inc. | MC % | % Thick. Inc. | % Thick. Inc. | % Retained MOR |
| 1 | 4 | 4½ | 6554 | 53.3 | 243 | 53.8 | 4.9 | 10.1 | 2.4 | .10 | 8.9 | 83 |
| 2 | 4 | 4 | 6047 | 52.3 | 184 | 52.8 | 6.0 | 11.8 | 4.0 | .10 | 8.2 | 80 |
| 3 | 4 | 3½ | 6304 | 53.2 | 245 | 55.1 | 6.3 | 12.7 | 4.2 | .10 | 7.5 | 81 |
| 4 | 4 | 3 | 6191 | 53.1 | 218 | 54.2 | 6.1 | 11.4 | 5.3 | .10 | 8.1 | 79 |
| 5 | 4 | 2½ | 5964 | 54.3 | 140 | — | 6.5 | 14.7 | 7.1 | .17 | 9.5 | 68 |
| Typical Phenolic | 3.3 | 5½ | 5500 | 52.0 | 175 | — | 5.0 | 12.0 | 0 | .15 | 8.0 | 75 |

It can be seen from the results reported in the Table that an isocyanate binder can be introduced directly into the blow line out of a pressurized refiner so as to produce hardboard having very good wet and dry physical properties regardless of the cure time involved. The performance of each press load met commercial hardboard standards, and compared favorably with the ing to direct the flow of cooling fluid from said feed pipe toward the region where said inner tube is attached to said blow line wall and to promote swirling of said cooling fluid about said inner tube, and (b) said at least one cooling fluid outlet means comprises an exit pipe secured to said housing and communicating with said enclosed jacketed area, said exit pipe being angularly positioned on said housing to enhance cooling fluid circulation.

4. The apparatus of claim 1 wherein said enclosed jacketed area is provided with at least one baffle means to increase fluid turbulence.

5. The apparatus of claim 1 wherein the surface of said inner tube facing said enclosed jacketed area is threaded or knurled to increase the surface area and thereby improve heat transfer.

6. The apparatus of claim 1 wherein
(a) said resin outlet end of said inner tube and said one end of said housing located to the exterior of said resin outlet end are attached to the wall of said blow line, and said resin inlet end of said inner tube extends a short distance outwardly of said other end of said housing,
(b) said at least one cooling fluid inlet means comprises a feed pipe secured to said housing and communicating with said enclosed jacketed area, said feed pipe being angularly positioned on said housing to direct the flow of cooling fluid from said feed pipe toward the region where said inner tube is attached to said blow line wall and to promote swirling of said cooling fluid about said inner tube, and said at least one cooling fluid outlet means comprises an exit pipe secured to said housing and communicating with said enclosed jacketed area, said exit pipe being angularly positioned on said housing to enhance cooling fluid circulation,
(c) said enclosed jacketed area is provided with at least one baffle means to increase fluid turbulence, and
(d) the surface of said inner tube facing said enclosed jacketed area is threaded or knurled to increase the surface area and thereby improve heat transfer.

* * * * *